Figure 1:
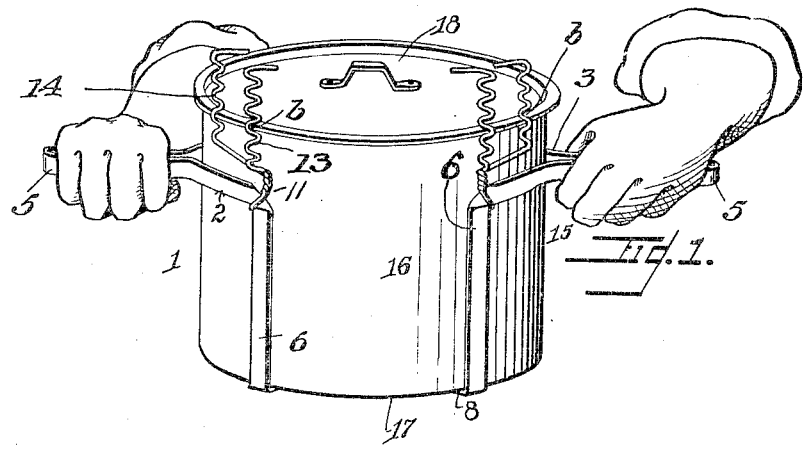

B. SWOBODA.
POT LIFTER AND LID HOLDER.
APPLICATION FILED MAY 29, 1919.

1,319,433.

Patented Oct. 21, 1919.

Inventor
Boleslaw Swoboda
by Elliott & Ammen
his Attys.

UNITED STATES PATENT OFFICE.

BOLESLAW SWOBODA, OF EAST ST. LOUIS, ILLINOIS.

POT-LIFTER AND LID-HOLDER.

1,319,433.   Specification of Letters Patent.   Patented Oct. 21, 1919.

Application filed May 29, 1919. Serial No. 300,675.

*To all whom it may concern:*

Be it known that I, BOLESLAW SWOBODA, a citizen of the United States, residing at East St. Louis and State of Illinois, have invented new and useful Improvements in Pot-Lifters and Lid-Holders, of which the following is a specification.

This invention relates to holding means to facilitate the handling of culinary pots, and is intended especially to facilitate the safe removal of such a pot from the stove without necessitating taking hold of its handle.

The general object of the invention is to produce a device of this character which is of very simple construction, and which can be readily applied so as to hold the pot securely, and enable it to be lifted from the stove and otherwise handled. One of the objects is to construct the device so as to enable the pot to be readily tilted in such a way as to pour off boiling soup or water; and one of the features of the invention is the provision of means for retaining the lid when the pot is tilted.

Further objects of the invention will appear hereinafter.

The invention consists in the novel features, and in the general combination of parts to be particularly described hereinafter, all of which contribute to produce a simple and efficient holding means for culinary pots. A preferred embodiment of my invention will be particularly described in the following specification, while the broad scope of my invention will be pointed out in the appended claims.

Figure 2:
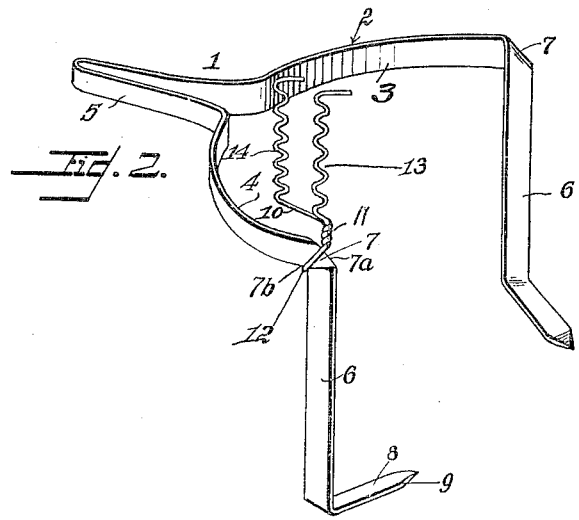

In the drawing,

Figure 1 is a perspective of a pot showing the device applied to the same, and illustrating how the holding means supports the pot; and Fig. 2 is a perspective illustrating one of the parts of the device.

Before describing my holding means in detail, I desire to say that it is preferably constructed of two independent devices or parts which are substantially duplicates of each other, that is to say, one is a right hand device, and the other a left hand device. These devices are so constructed as to adapt them to be applied to opposite sides of the pot. They are provided with handles for supporting them and with a rudimentary socket or yoke-shaped means for engaging the sides of the pot, and means for engaging the bottom of the pot at its edges to enable the holders to support and hold the pot. They are also preferably provided with means for retaining the lid of the pot, which is useful if it is desired to tilt the pot to pour off a boiling liquid. Obviously, my holding means is useful even in cases where it is not necessary to pour off the liquid, that is to say, it is very useful merely for removing a pot from the stove.

Referring more particularly to the parts, especially to Fig. 2, 1 indicates the right hand device or part of my holding means, which is preferably formed of a metal strap, the body of which is bent into the form of a yoke 2 consisting of two forks 3 and 4, for engaging around the sides of the pot, and connected by an integral handle 5. Adjacent to the ends of each yoke the material of the strap has a downward extension or leg 6. These legs are preferably formed simply by bending and turning the metal over upon itself so as to form an angle 7. The lower ends of the legs 6 terminate in inwardly projecting fingers 8 which are substantially at right angles to the legs 6, and these fingers 8 are preferably provided with tapered points 9 which facilitate their being shoved under the bottom of the pot.

Two of the devices as described above, one right hand and the other left hand, may be used for lifting a pot from a stove and positively holding it without danger of scalding or burning the cook. If it is desired to enable a pot to be lifted from the stove and the contents poured off, then the device is preferably provided with retaining means 10 for engaging the lid of the pot, said retaining means being constructed to adapt it to function effectively with pots of different depths. This means is preferably formed of wire, attached at one of the angles 7 and forming a twisted shank 11 beyond a loop 12 which attaches in this angle at the junction of the fork and the leg. The wires forming the shank 11 separate and form two forks 13 and 14 which extend upwardly, and these forks are preferably constructed so as to enable them to engage the lids of pots of different depths. For this purpose, the extensions 13 and 14 are preferably bent laterally so as to present a plurality of recesses *b*, which recesses are at different levels, any one of which may engage the lid of the pot.

It should be clearly understood that there are two devices such as the device 1, that is to say, a second device 15 is provided similar to the device 1 but of left hand construction, see Fig. 1. This figure clearly illustrates the manner of using the holding means. In doing so the handles are held in the hands of the cook so that the yokes 2 of the devices engage the sides of the pot 16, the fingers 8 extending under the bottom of the pot at its edge 17. With the pot supported as illustrated in Fig. 1, it is evident that if it is tilted forwardly in such a way as to pour off the contents of the pot, the lid 18 would tend to slide off the pot. This is prevented by the lid-retaining means 13 in the manner described, that is to say, the edge of the lid will come into contact with one of the recesses *b* and be prevented from sliding off.

Attention is called to the fact that in producing this device it is unnecessary to use any holes or rivets, and, by reason of the manner in which the angles 7 are formed, the loop 12 of the wire can be attached across the diagonal edge 7ª where the metal is folded and will lie in the angle 7ᵇ formed between the leg and the fork 4. If the wires which form the shank 11 are tightly twisted, the loop can be made very secure and will thereby insure that the extensions 13 and 14 will be sufficiently rigid to perform their function effectively.

The extension 14 of each lid holding means is disposed toward the handle of the corresponding holder, and the extension 13 is substantially above the leg 6.

I prefer this construction on account of the fact that when the holders are used with small pots, the wire extensions of the lid-holding means of the two holders will not touch each other. The material out of which the holders are formed, is preferably resilient. It is evident that the holders can be readily used with pots of different sizes.

It is understood that the embodiment of the invention described is only one of the many embodiments my invention may take, and I do not wish to be limited in the practice of the invention, nor in my claims to the particular embodiment set forth.

What I claim and desire to secure by Letters Patent is:

1. Holding means for handling culinary pots and the like, comprising two independent holders adapted to be held, one in each hand and applied to opposite sides of the pot, each of said holders having yoke-shaped means for engaging the sides and bottom of the pot at its edges, enabling the pot to be positively held, said holders each having a laterally disposed handle for supporting the same.

2. Holding means for handling culinary pots and the like, comprising two independent holders adapted to be held, one in each hand and applied to opposite sides of the pot, each of said holders having yoke-shaped means for engaging the side of the pot and having fingers for engaging under the bottom of the pot, enabling the pot to be positively held, and having means for retaining the lid of the pot.

3. Holding means for handling culinary pots, and the like, comprising two independent holders, each having a handle for supporting the same, enabling said holders to be applied to opposite sides of the pot, each of said holders having a yoke for engaging the side of the pot and having arms extending downwardly from the yoke and terminating in fingers to engage under the edges of the bottom of the pot for supporting the same.

4. Holding means for handling culinary pots, and the like, comprising two unconnected holders, each holder having a handle, enabling said holders to be held, one in each hand, and applied to opposite sides of the pot, each holder having two inwardly projecting fingers adapted to engage under the bottom of the pot at its edges, and lid retaining means extending upwardly from each of said holders and having a plurality of recesses at different levels for engaging a lid on the pot, said recesses adapting said retaining means for use with pots of different depth.

5. A holding device for handling culinary pots, and the like, consisting of a strap having a yoke for engaging the side of the pot, and having a handle projecting from said yoke, a leg extending downwardly from a point adjacent each end of said yoke, and a finger at the end of each leg to project under and engage the bottom of the pot at its edge, and lid retaining means consisting of a wire attached to said yoke extending upwardly, said wire being bent laterally to form a plurality of recesses for engaging the lid of the pot to retain the same.

6. Holding means for handling culinary pots and the like, comprising two holders adapted to be applied to opposite sides of the pot, each of said holders having means for engaging the bottom of the pot at its edges, for lifting the pot, means for engaging around the sides of the pot for positively holding the same, means for retaining the lid of the pot, and having a laterally disposed handle for supporting the same.

In testimony whereof, I have hereunto set my hand.

BOLESLAW SWOBODA.

Copies of this patent may be obtained for five cents each, by addressing the "Commissioner of Patents, Washington, D. C."